United States Patent [19]
Zangl

[11] 3,787,155
[45] Jan. 22, 1974

[54] SEGMENTED VULCANISING TIRE MOULD

[76] Inventor: Karl Zangl, Kantstrasse 10, Munich, Germany

[22] Filed: Aug. 1, 1972

[21] Appl. No.: 276,904

[52] U.S. Cl.................. 425/47, 425/46, 425/DIG. 5
[51] Int. Cl............................................... B29h 5/08
[58] Field of Search...... 425/46, 47, 16, 39, DIG. 5, 425/43

[56] References Cited
UNITED STATES PATENTS

| 2,064,416 | 12/1936 | Daniel | 425/16 |
| 2,185,543 | 1/1940 | Daniel | 425/16 |
| 3,337,918 | 8/1967 | Pacciarini et al. | 425/39 |
| 3,396,221 | 8/1968 | Balle et al. | 425/43 X |

FOREIGN PATENTS OR APPLICATIONS

| 1,160,606 | 1/1964 | Germany | 425/47 |
| 1,917,081 | 10/1970 | Germany | 425/47 |
| 1,919,884 | 3/1971 | Germany | 425/46 |
| 2,000,796 | 7/1971 | Germany | 425/46 |

Primary Examiner—J. Howard Flint, Jr.
Attorney, Agent, or Firm—Ostrolenk, Faber, Gerb & Soffen

[57] ABSTRACT

The specification describes a vulcanising mould for vehicle tires, comprising a first side wall mould part with radially outwardly extended support arms, a second side wall mould part and a tread mould ring subdivided into radially movable profile segments. The profile segments have conical sliding shoes on their outer surface. These shoes are provided with a surrounding part whose internal surface is conical. The surrounding part serves to produce radial movement of the profile segments when relative axial movement takes place between the surrounding part and the tread mould ring. The axial guide means of the first side wall mould part in the surrounding part comprises recesses in the surrounding part in which the extended carrying arms of the first side wall mould part can be displaced axially. The radial guidance of the sliding shoes of the profile segments is ensured by support screws which can be displaced radially in slots in the support arms.

11 Claims, 14 Drawing Figures

PATENTED JAN 22 1974  3,787,155

SEGMENTED VULCANISING TIRE MOULD

BACKGROUND OF INVENTION

1. Field to which Invention Relates

The present invention relates to vulcanising moulds, and more particularly to a vulcanising mould for vehicle tires comprising a first side wall mould part with radially outwardly extended carrying arms, a second side wall mould part and a tread mould ring, which is subdivided into radially moving, guided profile segments, which on their outer surfaces are provided with conical shaped sliding shoes, which shoes are each provided with a surrounding part on their inner sides of conical shape, the surrounding part serving to drive radially the profile segments upon relative axial movement between the peripheral part and the tread mould ring, and the first side wall mould part in the surrounding part being guided in an axially movable manner in relation to the surrounding part.

2. The Prior Art

For the production of steel fabric tires or radial ply tires of non-elastic material radially divided tire vulcanising moulds with for example eight to ten profile segments are necessary, which on closing of the heating press are pressed radially inwards into the tread of the tire which is still in the green condition and on opening are drawn out of the tire.

In the case of previously proposed tire vulcanising moulds of the above-mentioned type only the tread profile is incorporated in the profile segments, while the profile parts forming the tire shoulders are machined, for instance by being milled into the upper part of the side mould and the lower part. This is necessary because the radial opening displacement of previously proposed radial moulds is too small to make possible the use of profile segments with a tread profile and at the same time a cast-on side profile for the tire shoulders. The use of multi-part profile segments for the tread and side or lateral profile however makes the production of the tire moulds very difficult and expensive.

In order to increase the radial opening displacement or movement of the profile segments there are two possibilities: On the one hand, the angle of the conical surrounding parts can be made less steep or flatter or, on the other hand, the axial displacement, through which the profile segments are moved in the guide means, can be extended. The use of a flat cone makes necessary a larger force for closing the mould, since there is a greater resulting frictional resistance.

An increase in the axial displacement of the profile segments is not possible in the case of previously proposed radial tire moulds either, since in this case the overall height of the tire mould is too large. The tire mould segments would project so far on the surrounding part that on closing the heating press they would make contact with the tire and might deform it. In order to avoid this, tire heating presses with a larger vertical opening movement must be provided, which however involve a high capital expenditure.

SUMMARY OF INVENTION

One aim of the present invention is to create a vulcanising mould of the above-mentioned type in the case of which the radial opening displacement of the profile segments is made larger without increasing the dimensions of the tire mould with the built-in tire mould segments The present invention consists in a vulcanising mould for vehicle tires comprising a first side wall mould part with radially outwardly extended carrying arms, a second side wall mould part and a tread mould ring, which is subdivided into radially moving, guided profile segments, whose outer surfaces are provided with conical shaped sliding shoes, which are provided with a surrounding part on its inner side of conical shape, the surrounding part serving to drive radially the profile segments on relative axial movement between the peripheral part and the tread mould ring, and the first side wall mould part in the surrounding part is guided in an axially movable manner in relation to the surrounding part, and the axial guide means for the first side wall mould part in the surrounding part comprises recesses in the surrounding part, and in the recesses the extended carrying arms of the first side wall mould part can be displaced axially and the radial guide means for the sliding shoes of the profile segments comprises support screws which can be displaced radially in slots of the support arms.

In this respect it is advantageous if the sliding shoes, which are attached to the carrying arms with the support screws, can be moved radially outwards or inwards by axial ejection or drawing in of the first tire mould part by means of guide means incorporated in the surrounding part.

The maximum radial opening displacement of the radially divided profile segments can be obtained for a given tire mould size by adopting the feature that the radial guide means are incorporated in the surrounding part between the outermost upper and lower ends of the surrounding part.

The surrounding part can be attached on the lower or upper part of the heating press and the first tire mould part carrying the sliding shoes can be capable of being displaced by an actuating cylinder in the axial direction.

Furthermore, in the case of a surrounding part attached to the lower part of the heating press it is possible for the sliding shoes and thus the first tire mould part to be biased in relation to the surrounding part by spring means in the opening direction so that the tire mould blank can be placed from above onto the first tire mould part which is additionally raised by the sliding shoes, and the tire mould can be held by the spring elements in the outermost opening position. In this case the actuating cylinder for the tire mould part can be dispensed with.

In all these cases it is advantageous if the radial and concomitant axial opening displacement of the tire mould can be adjusted precisely by means of spacer sleeves.

The construction in accordance with the invention of the tire vulcanising mould enables the radial opening displacement of the profile segments to be increased to such an extent in an outward direction that integral profile segments which demould the tread and the tire shoulder can be used.

LIST OF SEVERAL VIEWS OF DRAWINGS

The invention will be described in detail with reference to the embodiments shown in the accompanying drawings.

FIG. 6 is a section along the line B-B in accordance with FIG. 5 in which the upper part of the tire mould and the sliding shoes with the profile segments are drawn in.

FIG. 7 is an axial section similar to the lefthand half of FIG. 3, though the sliding shoes are ejected together with the profile segments and the axial displacement of the sliding shoes on the guide bolts or pins is limited by spacer sleeves.

FIG. 8 is a section of the surrounding part with a shoulder and hole for the upper bearing surface of the guide pins.

DESCRIPTION OF PREFERRED EMBODIMENTS

Figure 1:
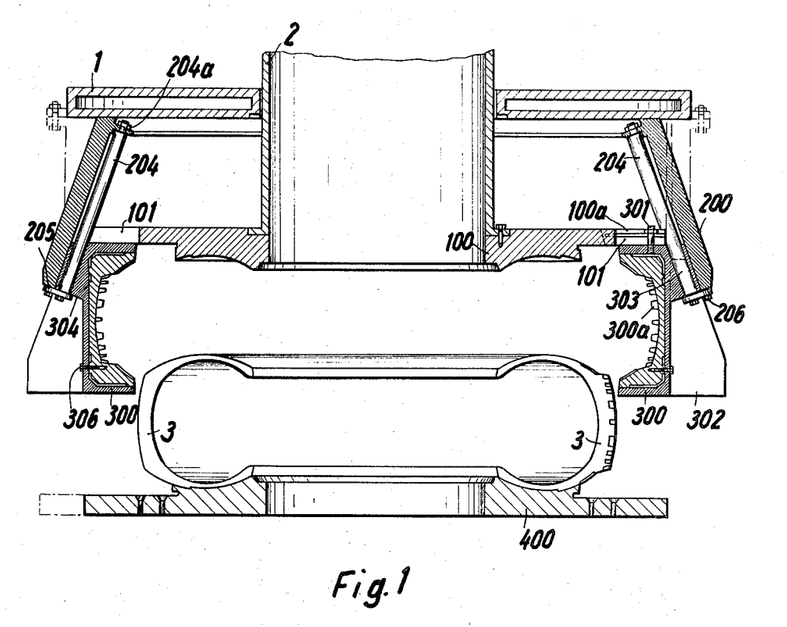
FIG. 1 shows an axial section through a tire mould in accordance with the invention with the heating press opened and the profile segments ejected. The tire is laid in position on the lower part of the tire mould and the unvulcanised tire blank is shown in the left-hand half of the figure for closing of the mould while in the right-hand half of the figure the finished, vulcanised tire is shown when the tire mould has been partly opened after vulcanisation, into a raised condition.

In FIG. 1 the tire vulcanising mould in accordance with the invention is shown with the tire heating press in the half opened condition. The vulcanising mould comprises the upper part of the tire mould formed by a first tire mould part 100, and also a surrounding part 200 and sliding shoes 300, which by means of guiding pins 204 are guided in the surrounding part 200. The mould also comprises a second tire mould part 400 forming the lower part of the tire mould. The first tire mould part 100 is separated from the surrounding part 200, in which the sliding shoes 300 with the tire profile segments 300a attached to them are guided on guide pins. The shoes 300 and tire profile segments 300a collectively form the tread mould ring which encircles the portion of the tire in which the tread is formed.

On the first tire mould, part 100 constituting the upper part of the tire mould support or carrying arms 100a for the attachment and radial guidance of the sliding shoes 300, with the profile segments 300a attached to them, are arranged. These carrying arms each have a respective slot guide 101. On the carrying arms a hardened steel plate 102 is also screwed with a slot 102a. In the slot guides 101 and 102a there slides an attachment screw 301, on which the sliding shoes 300 with the profile segments 300a are attached.

In the surrounding part 200 the sliding shoes 300 are held by means of pin guides 204. Owing to the fact that the sliding shoes 300 are guided on the one hand by the pin guide means 204 in the surrounding part and on the other hand in the slots 101 of the carrying arms 100a of the first tire mould part there is also a provision for the guidance of the first mould part in the surrounding part. In order to allow the largest possible displacement in a radial direction of the sliding shoes 300 and the tire profile segments 300a respectively, it is necessary for the carrying arms 100a to have a long sliding surface for the sliding shoes 300 and thus also for the profile segments 300a. This long displacement is achieved without increasing the dimensions of the vulcanising mould vis-a-vis conventional vulcanising moulds, if the surrounding part 200 is provided with deep recesses 202 (FIG. 5) on its inner conical sliding surface so that the extended carrying arms can slide in the recesses without their displacement in the axial direction being limited by the surrounding part 200.

The axial sections shown in FIGS. 2, 3, 4, 6, and 7 show the tire vulcanising mould in accordance with FIG. 1 in further positions.

Figure 2:
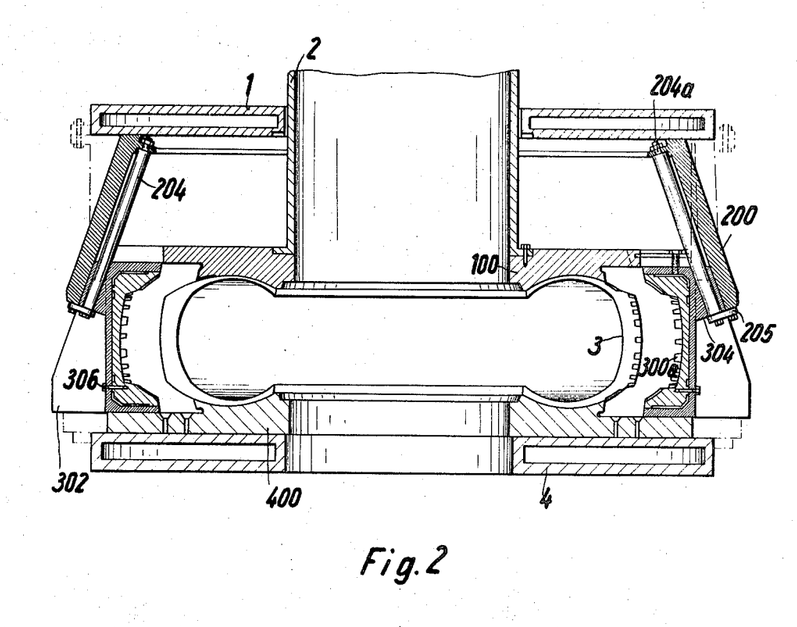
FIG. 2 is an axial section similar to FIG. 1 though the heating press is practically closed and the upper tire mould side part makes contact with the tire and the sliding shoes come to rest on the lower part of the tire mould.

The manner of operation of the vulcanising mould in accordance with FIGS. 1 to 8 is as follows:

In FIG. 1 the upper part 1 of the heating press with the surrounding part 200 attached to it and the built-in actuating cylinder 2 are shown, and the upper part 100 of the tire mould is connected with the cylinder 2. The upper part 100 is associated with the sliding shoes 300, suspended from the carrying screws 301, and the profile segments 300a, the upper part of the heating press is located directly above the tire blank and the profile segments 300a have abutted against the abutment 304. The tire mould is thus located in its position with the widest opening and the tire blank 3 is laid on the lower part 400 of the tire mould. The upper part 1 of the heating press is now lowered until the sliding shoes 300 abut against the lower part 400 of the tire mould, as shown in FIG. 2. At the same time the upper part 100 of the tire mould comes to lie against the tire 3, which is now held captive in the tire mould.

Figure 3:
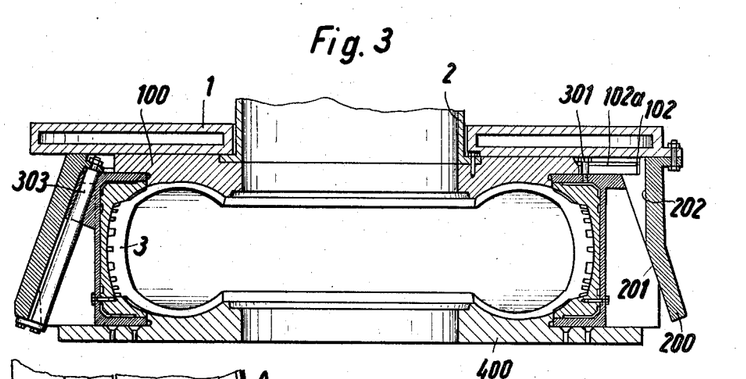
FIG. 3 is an axial section similar to FIG. 1 with the heating press and the tire mould completely closed. The left-hand half of FIG. 3 represents a section along the line A-A of FIG. 5 and the right-hand half of FIG. 3 represents a section along the line B-B in accordance with FIG. 5.

The position shown in FIG. 3 is achieved by further lowering of the upper part 1 of the heating press. The profile segments are moved radially inward towards the tire 3 by means of the surrounding part 200 and the guiding bolts or pins 204 until the tire mould is firmly closed, as is shown in FIG. 3. In this position the tire is vulcanised with suitable internal pressure media.

After the vulcanisation the tire deprived of pressure is held by the actuating cylinder 2 and the upper part 100 of the tire mould against the lower part 400 of the tire mould, as is shown in the right-hand half of FIG. 2 and the upper part 1 of the heating press draws the surrounding part 200 upwards so that the sliding shoes 300 and the profile segments 300a are drawn out of the tire. Thus, the position shown in FIG. 2 is reached, in which the guide pins 204 and the sliding shoes 300 with the profile segments 300a have been drawn radially out of the tire until they encounter the abutments 205 and 304. On continuation of the vertical opening movement the upper part 1 of the heating press entrains the sliding shoes 300 further in an upward direction back into the position shown in the right-hand half of FIG. 1.

Figures 6, 7, 8:
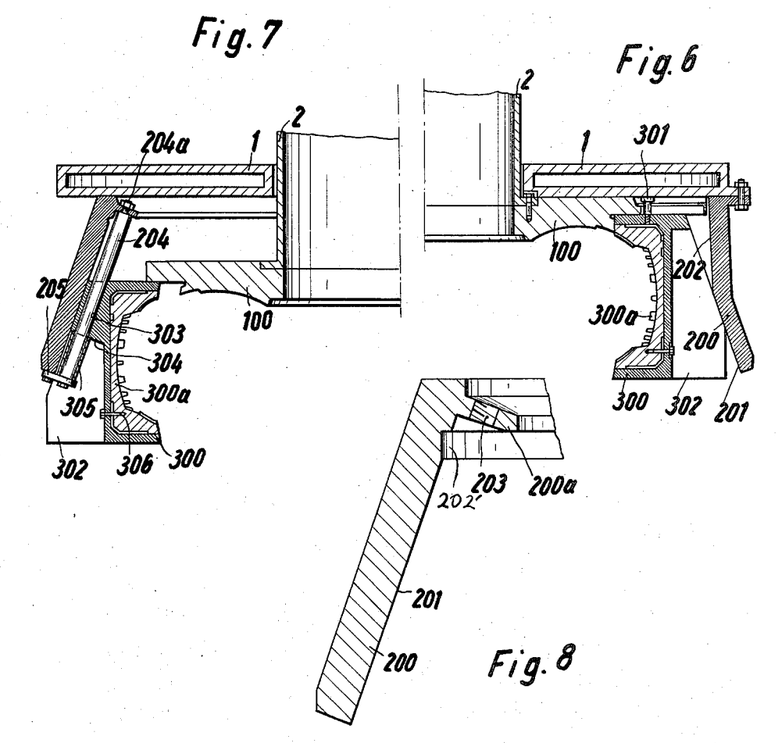

The actuating cylinder 2, to which the upper part 100 of the tire mould with the sliding shoes 300 and the profile segments 300a are attached, now draws the tire mould part 100 and with it the sliding shoes 300 with the profile segments 300a into the surrounding part 200, as is shown in FIG. 6. The upper part 1 of the heating press can now move away with the tire mould in a rearward direction. The vulcanised tire is removed from the heating press and a fresh tire blank is placed in position, following which the heating press can be moved back again vertically over the tire into the position in accordance with FIG. 1 without the tire mould touching the tire as a result.

Figures 4, 5:
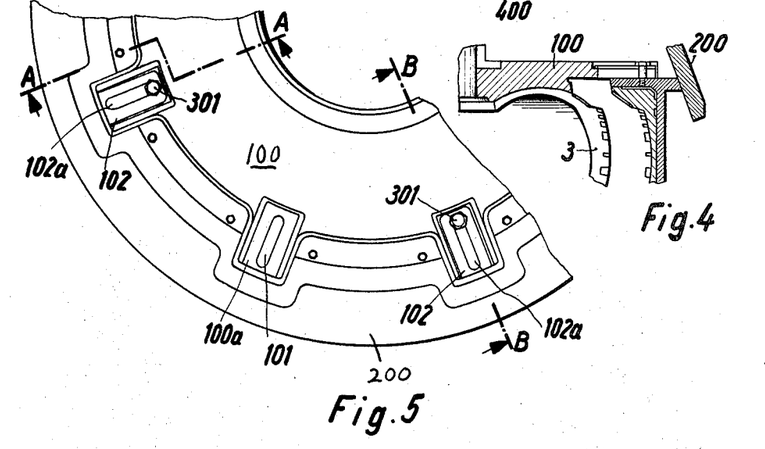
FIG. 4 shows a section on the line B-B in accordance with FIG. 5 with the sliding shoes ejected.
FIG. 5 shows a partially broken away plan view of the tire mould in accordance with FIG. 1 incorporating the invention.

FIGS. 4, 5, and 8 show further details and modifications of the tire mould in accordance with FIG. 1.

FIG. 4 is a section through the tire mould with the sliding shoes 300, in the ejected state, and the profile pieces 300a similar to FIG. 3.

FIG. 5 is a plan view of the tire mould in accordance with FIG. 1, from which one can see details of the upper tire mould part 100 and the surrounding part 200. The upper tire mould part 100 is provided with support arms 100a, which have a slot guide means 101. On these support arms a sliding disc 102 is also placed making use of a slot 102a in order to achieve a low-wear guidance of the sliding shoes 300 and the support or carrying screws 301 of the sliding shoes. The support arms 100a of the upper tire mould part 100 run in recesses 202 of the surrounding part 200 so that an unhindered displacement of the upper part 100 of the tire mould is possible in the surrounding part.

FIG. 8 is a section through the surrounding part 200 in accordance with FIG. 7. The surrounding part shown in this state has an annular shoulder 200a with a threaded hole 203 for the fixation of the guide pins 204. On the inner side of the surrounding part a conical sliding surface 201 is provided. The recess 202' shown in FIG. 8 for the displacement of the support arms is only small in the case of this figure so that it can be produced by simple removal of material from the surrounding part 200 by turning on a lathe.

This small recess 202' is particularly suitable additionally in cases in which tires with profiles which have short lateral profile parts, and therefore do not require the full opening displacement for the slide shoes, are to be vulcanised.

Furthermore, tire presses are used which have a smaller vertical opening displacement and in the case of which the profile segments cannot be ejected for the full length. In order to be able to adapt the tire mould in accordance with the invention to suit every conceivable heating press in a simple manner spacer sleeves 305 can be incorporated over the guide pins 204 in order to set the opening displacement of the sliding shoes 300 in accordance with heating presses available.

Figure 9:
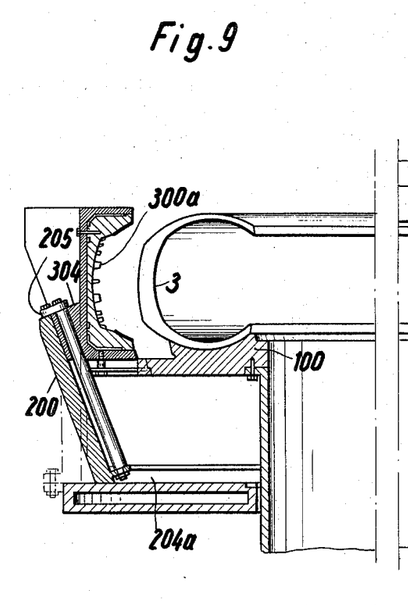
FIG. 9 shows a section of the tire mould in accordance with the invention which is incorporated on a lower heating press part with an actuating cylinder.

There are, however, also heating presses in the case of which in the upper part of the heating press no actuating cylinder 2 is incorporated so that the tire mould in accordance with the invention cannot be used in the manner described. If in the case of these heating presses an actuating cylinder 2 is incorporated in the lower part of the heating press, the tire mould in accordance with the invention can be used in the form shown in FIGS. 9 and 10. In the case of these heating presses the actuating cylinder 2 is incorporated in the lower part 4 of the heating press. The surrounding part 200 with the sliding shoes 300 and the profile segments 300a are in this case fixed to the lower part 4 of the heating press, so that the first tire mould part 100 now constitutes the lower tire mould part. The manner of operation of this second embodiment of the tire mould press in accordance with the invention is as follows:

In this case the actuating cylinder 2 is used to raise the tire mould part 100, which in this case constitutes the lower tire mould part, together with the sliding shoes 300, standing on it, and the profile segments 300a and thus brought into the maximum radial position of opening. The tire blank 3 is now placed on the first tire mould part 100, as shown in FIG. 9.

Figure 10:
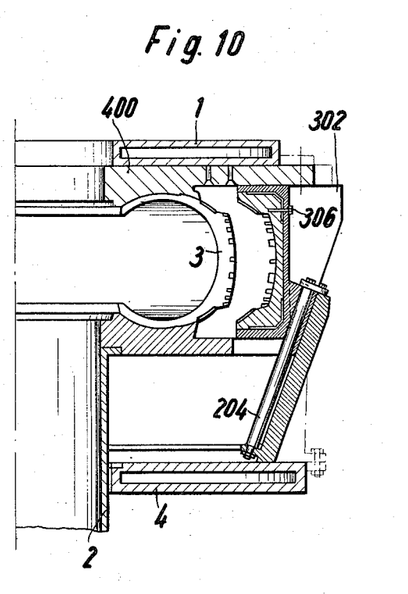
FIG. 10 is a section of the tire mould in accordance with FIG. 9 with the sliding shoes ejected.
Figure 11:
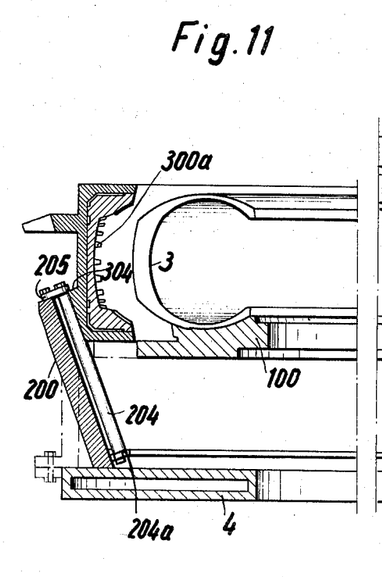
FIG. 11 is a section of a modified tire mould in accordance with the invention in the case of which the sliding shoes are ejected by spring pressure.

On closing the heating press the second tire mould part 400 which is attached to the upper heating press part 1 (now constituting the upper tire mould part) comes to lie against the tire and against the sliding shoes 300, which are guided on the tire mould part 100, as is shown in FIG. 10. In the following closing movement of the tire press the sliding shoes 300 are pressed downwards while the cylinder 2 yields, until the tire mould 100 lies against the lower part 4 of the heating press and the radial mould is hermetically sealed.

After vulcanisation, the upper part of the heating press 1 together with the tire mould part 400 are moved upwards. By raising the pressure cylinder 2 the tire mould part 100 is raised and the sliding shoes 300 which are guided radially on the guide pins 204, are simultaneously moved outwards and the profile 300a is pulled out of the tire. FIG. 10 shows the ejected tire with the tire mould part 400, which still lies against the sliding shoes 300.

Use is, however, also made of tire presses in the case of which actuating cylinders are not provided in the upper part or in the lower part of the heating press. In these cases a second embodiment of the invention can be used, in the case of which the tire mould part 100 with the sliding shoes 300 fixed to it, is biased in relation to the surrounding part by means of springs.

Such an embodiment of the tire vulcanising mould is shown in FIGS. 11 to 14.

Figure 12:
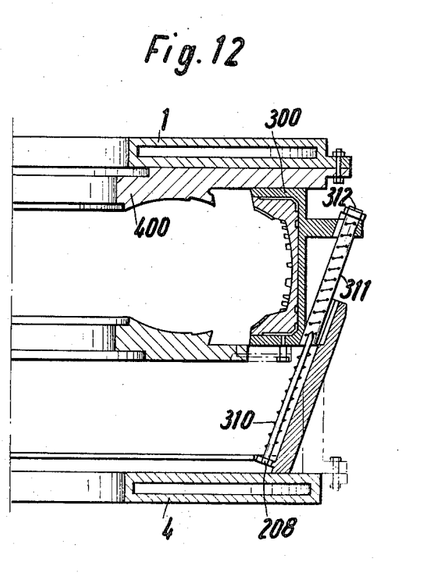
FIG. 12 is a section through the tire mould in accordance with FIG. 11 with built-in compression springs.

As can be seen from FIG. 12 between the surrounding part 200 and the sliding shoes 300 spring elements 310 with guide means 208, 311 are provided and the guide tubes 311 are connected by suitable screw threads with one side of the sliding shoe and the guide pins 208 are fixed on the shoulder 200a of the surrounding part 200 in further holes 203. By means of the springs 310 the sliding shoes 300 are so biased with respect to the surrounding part 200 that they can be moved outwards into the wide open position and simultaneously entrain the attached tire mould part 100 with them in an upward direction, and this brings about a simultaneous guidance of the sliding shoes.

The tire blank, as is the case with the embodiment in accordance with FIGS. 9 and 10, can be placed in the opened tire mould and on closing the heating press the tire mould part 400 presses onto the sliding shoes 300 and against the side wall of the tire, as is shown in FIG. 12. In the case of continuation of the closing movement the sliding shoes 300 are pressed against the resistance of the springs 310 downwards and by means of the guide means 204 (FIG. 11) are simultaneously moved in a radial direction towards the tire 3 lying in the same plane until the tire mould is completely closed.

After the vulcanisation of the tire the upper part 1 of the heating press together with the tire mould part 400 moves upwards. Owing to the spring pressure the sliding shoes 300 with the profile segments 300*a* are pressed upwards (FIG. 12) and guided outwards by means of the guide pins 204 and thus drawn out of the tire 3.

Figure 14:
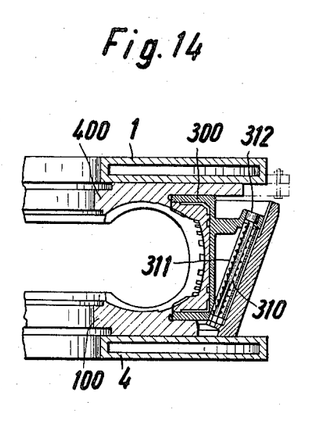
FIG. 14 is a section through the sliding shoes, actuated by a spring pressure, with the tire mould in the closed condition and the tire laid in position.

FIG. 14 shows the completely closed position of the tire mould in accordance with FIG. 12. In this position the spring 310 is compressed and the tire mould is completely closed.

Figure 13:
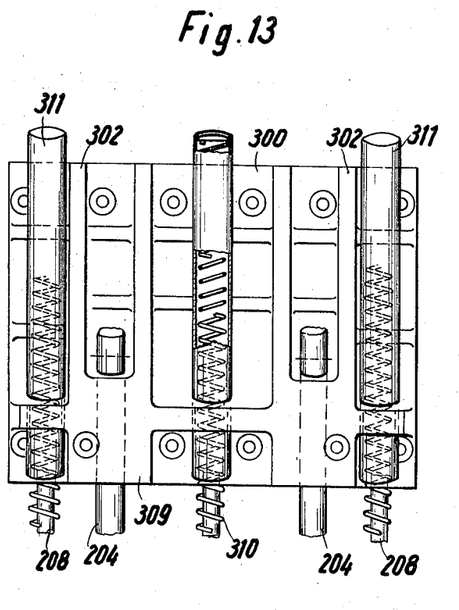
FIG. 13 is a rear view of the sliding shoes of the tire mould in accordance with FIG. 11 with built-in compression springs and guide pins or bolts.

FIG. 13 shows details of the arrangement of the springs with the guide pins 208 and the guide sleeves 311.

The guide sleeves 311 on the rear side of the sliding shoes 300 are for example screwed into holes provided with a screw thread so that it is simple to bias the springs 310 on fitting them with the help of the guide sleeves 311 so as to act in the opening direction of the sliding shoes. The guide pins 208 extend into the helical springs and are attached on the surrounding part in the holes 203 (FIG. 8). The sliding shoes are guided by means of the sliding pins 204 and thus have their sliding surfaces 302 lying against the surrounding part.

A further embodiment of the guide sleeves is shown in FIG. 14, in which the guide sleeves 311 are open at the upper end and after insertion of the spring 310 are closed by means of a screw cap 312. The manner of operation of the springs 311 is in this case the same as was the case with FIG. 13.

What I claim is:

1. A vulcanising mould for vehicle tires comprising a first side wall mould part with radially outwardly extended carrying arms, a second side wall mould part and a tread mould ring, which is subdivided into radially movable, guided profile segments, having their outer surfaces provided with conical shaped sliding shoes, said shoes being further provided with an axially movable surrounding part having an inner side of conical shape, the surrounding part serving to drive radially the profile segments upon relative axial movement between the surrounding part and the segments of the tread mould ring, and the first side wall mould part in the surrounding part is guided in an axially movable manner in relation to the surrounding part, the surrounding part having guide means comprised of recesses provided along the interior of the surrounding part for receiving and guiding the first sidewall mould part, whereby the extended carrying arms of the first side wall mould part can be displaced axially within the recesses, said carrying arms having radial guide means comprising slots for radially guiding the sliding shoes of the profile segments, support screws being movable in the radial guide means slots and secured to the shoes for supporting the said shoes and to provide for radial movement of the segments.

2. A vulcanising mould in accordance with claim 1, in which the surrounding part has guide pins between its outer upper and lower ends for radially driving the profile segments.

3. A vulcanising mould in accordance with claim 1, in which the side wall mould part connected with the sliding shoes and the surrounding part is connected with the upper part while the second side wall mould part is connected with the lower part of a vulcanising press.

4. A vulcanising mould in accordance with claim 3, in which the surrounding part is connected in a fixed manner with the upper part of the vulcanising press and the first side wall mould part is capable of being displaced in an axial direction in relation to the upper part by means of an actuating cylinder.

5. A vulcanising mould in accordance with claim 1, in which the side wall mould part connected with the sliding shoes and the surrounding part is connected with the lower part and the second side wall mould part is connected with the upper part of a vulcanising press.

6. A vulcanising mould in accordance with claim 5, in which the surrounding part is connected in a fixed manner with the bottom part of a vulcanising press and the first side wall mould part can be displaced using an acutating cylinder in an axial direction in relation to the lower part.

7. A vulcanising mould in accordance with claim 6, in which the sliding shoes can be pressed with the first side wall mould part by springs until they abut in their maximum opening position.

8. A vulcanising mould in accordance with claim 7, in which the surrounding part has shoulders with holes for the screwing in of spring guide pins, on which the springs are carried, while in the rear part of the sliding shoes threaded tubes, closed at their top ends, are screwed in for receiving the springs.

9. A vulcanising mould in accordance with claim 8, in which the threaded tubes with the springs in the rear part of the sliding shoes and the guide pins can be incorporated in and removed from an angular shoulder on the surrounding part.

10. A vulcanising mould in accordance with claim 2, in which the surrounding part has shoulders at the narrower end of its conical shaped portion, each of said shoulders having a hole, the upper end of said guide pins being fixed in said holes, fixing means forming a surface of the sliding shoe abutment, said fixing means including means for mounting the opposite ends of said guide pins.

11. A vulcanising mould in accordance with claim 10, in which the opening displacement of the vulcanising mould can be adjusted by means of spacer sleeves, placed on the guide pins, between the surface of the sliding shoe abutment and the sliding shoe.

* * * * *